(12) United States Patent
Fillion et al.

(10) Patent No.: US 8,134,578 B2
(45) Date of Patent: Mar. 13, 2012

(54) HYBRID IMPORTANCE MAPS FOR CONTENT AWARE DIGITAL IMAGE RESIZING

(75) Inventors: Claude S. Fillion, Rochester, NY (US); Vishal Monga, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 700 days.

(21) Appl. No.: 12/174,767

(22) Filed: Jul. 17, 2008

(65) Prior Publication Data

US 2010/0013827 A1    Jan. 21, 2010

(51) Int. Cl.
*G09G 5/00* (2006.01)

(52) U.S. Cl. ........................ 345/660; 345/581

(58) Field of Classification Search .................. 345/660, 345/581

See application file for complete search history.

(56) References Cited

U.S. PATENT DOCUMENTS

| | | | |
|---|---|---|---|
| 6,170,073 B1 * | 1/2001 | Jarvinen et al. | 714/758 |
| 6,516,096 B2 | 2/2003 | Yokose et al. | |
| 6,670,963 B2 * | 12/2003 | Osberger | 345/629 |
| 7,174,050 B2 | 2/2007 | Balmelli et al. | |
| 7,574,069 B2 * | 8/2009 | Setlur et al. | 382/276 |
| 2008/0019575 A1 * | 1/2008 | Scalise et al. | 382/118 |
| 2009/0180713 A1 * | 7/2009 | Bucha et al. | 382/300 |

OTHER PUBLICATIONS

Avidan, et al., "Seam Carving for Content-Aware Image Resizing," 9 pages, Aug. 2007.

* cited by examiner

*Primary Examiner* — Said Broome
*Assistant Examiner* — Wynton S Jones
(74) *Attorney, Agent, or Firm* — Philip E. Blair; Fleit Gibbons Gutman Bongini & Bianco P.L.

(57) ABSTRACT

What is disclosed is a novel system and method for content-aware resizing of a digital image. To take advantage of the characteristics of various importance maps generated for the image using different operators such as, for example, gradient, entropy, probabilistic operators, and the like, a method is provided herein for combining generated pixel importance maps. The present method uses a weighted combination of pixel importance maps—one corresponding to each image operator, to produce a hybrid map for all the image. The image can then be resized based on this hybrid map. The present method provides a high degree of image resizing flexibility and has broad applicability across differing classes of images and applications such as display, printing, packaging, and other document image processing software performing document layout, image personalization, and the like.

11 Claims, 7 Drawing Sheets

HYBRID IMPORTANCE MAPS FOR CONTENT AWARE DIGITAL IMAGE RESIZING

TECHNICAL FIELD

The present invention is directed to systems and methods which use importance maps to resize a digital image in an image processing system.

BACKGROUND

In computer graphics, image scaling is the process of resizing a digital image. Given the proliferation of images and the variety of available types of media (mobile phones, PDAs, printers, packaging, etc) available for display, image resizing occurs frequently.

Historically, cropping and scaling (downsampling) have been used to shrink images and upsampling has been used to enlarge images. Cropping works reasonably well for shrinking images if there is only one region of interest in the image. Scaling works reasonably well for shrinking images containing low frequency information. However, scaling is of limited value because the scaling, and hence loss of image information, is applied uniformly to the image. With proper region identification, cropping may be preferred over naïve scaling in applications such as generation of thumbnail images because the resultant images are more recognizable. Naïve cropping can be problematic because contextual information that is important to the viewer may be cropped away.

Image scaling is a non-trivial process that involves a trade-off between efficiency, smoothness and sharpness. As the size of an image is increased, the pixels which comprise the image become increasingly visible, making the image appear soft. Apart from fitting a smaller display area, image size is most commonly decreased in order to produce thumbnails. Enlarging an image is less common because, in zooming an image, it may not be possible to discover any more information in the image than which already exists and image quality tends to suffer.

Classical methods for image resizing, such as cropping and scaling, do not take into account the content of the image to be resized. Such methods are prone to distorting content that may be important to the viewer. In order to preserve regions of the image which may be visually important to the viewer while eliminating the less important ones, image resizing techniques need to be more content aware. The few existing methods that attempt content-based image resizing are typically based on geometric operators which seek to preserve key geometric components of the image. While geometry is important, image entropy also plays a key role in our perception of image content. Many content-aware resizing schemes based on geometric operators alone tend to ignore this important aspect.

The influence that a distortion has on overall picture quality is known to be strongly influenced by its location with respect to scene content. Knowledge of a scene is obtained through regular eye movements to reposition the area under foveal view. Early vision models assume an "infinite fovea", i.e., the scene is processed under the assumption that all areas are viewed by the high acuity fovea. However studies of eye movements indicate that viewers do not foveate all areas in a scene equally. Instead a few areas are identified as regions of interest (ROIs) by human visual attention processes and viewers tend to repeatedly return to these ROIs rather than other areas that have not yet been foveated. The fidelity of the picture in these ROIs is known to have the strongest influence on overall picture quality. The knowledge of human visual attention and eye movements, coupled with selective and correlated eye movement patterns of subjects when viewing natural scenes, provides a framework for the development of computational models of human visual attention. Techniques for determining visually important areas in an image use importance maps. Importance maps are generated by combining factors known to influence human visual attention and eye movements. A commonly used technique to build an importance map is to realize a gradient map of the image using a gradient operator. The magnitude of the gradient is a popular measure of local image geometry. See: *Digital Image Processing*, Gonzalez and Woods, Prentice Hall, p. 425 (2002).

Accordingly, what is needed in this art are increasingly sophisticated methods for digital image resizing which combine importance maps generated by different operators to take advantage of various quality characteristics produced by the differing operators in an image processing or document reproduction environment.

BRIEF SUMMARY

What is provided are a novel system, method, and computer program product for generating a hybrid importance map for a source image from a plurality of individual pixel importance maps. To take advantage of the characteristics of various pixel importance maps generated for the image using differing image operators such as, for example, gradient, entropy, and the like, a method is provided herein for combining generated importance maps in a weighted combination. The source image can then be resized based on the hybrid importance map.

In one example, an image to be resized is received. A plurality of image operators are selected for the image. Each of the image operators is selected because of its responsiveness to changes in neighboring pixels based on the content in the image. Each of the image operators is used to calculate a pixel importance value for each pixel in the image. The pixel importance values are calculated by each image operator with respect to a set of neighbor pixels surrounding the current pixel. The pixel importance values calculated by each operator collectively produce a pixel importance map for the image. A plurality of individual pixel importance maps results. The individual pixel importance maps are normalized and combined in a weighted combination to produce a hybrid importance map for all the image. The image is resized by selectively retaining pixels based on the hybrid importance map. The resized image is then output to an output device such as a display or a printing device.

Advantageously, the present method provides a high degree of image resizing flexibility and has broad applicability across differing classes of images and will find its uses in a variety of applications such as display, printing, packaging, and other document image processing software performing document layout, image personalization, and the like. The present method can be readily enforced by visualization and by synthesizing images that yield known resizing results.

The foregoing and other features and advantages will be apparent from the following more particular description of the embodiments of the invention, as illustrated in the accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
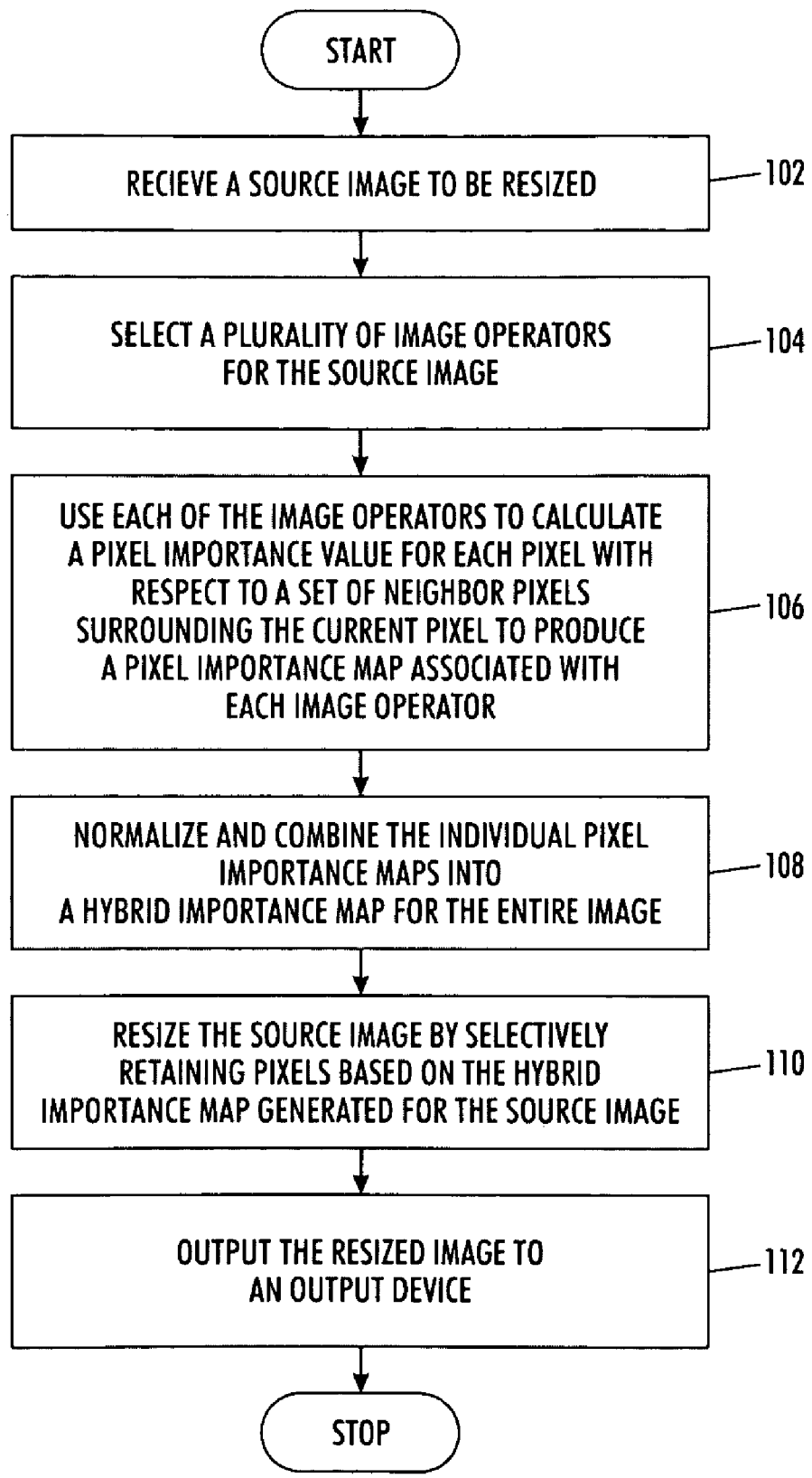
FIG. 1 illustrates one embodiment of the present method for generating a hybrid importance map from a plurality of individual pixel importance maps produced by their respective image operators.

What is provided are a system and method for combining pixel importance maps generated using a plurality of image operators into a hybrid importance map which takes advantage of quality characteristics produced by the differing image operators in a document processing environment.

It should be understood that one of ordinary skill in this art would be readily familiar with many facets of image processing such as resizing, operators such as gradient and entropy, importance maps, seam-carving techniques, and other algorithms common in the art of digital image resizing. Additionally, one of ordinary skill in this art would also be familiar with advanced mathematical techniques commonly used in this art. One of ordinary skill in this art would also be knowledgeable about computer science and software and programming systems and methods sufficient to implement the functionality and capabilities described in detail herein in their own hardware environments without undue experimentation.

A pixel, as used herein, refers to the smallest segment into which a printed image is divided and may also refers to a signal associated with a particular position in an image. Each pixel can be a bit in binary form, a gray scale value, or a set of coordinates in the color space of the image. Pixel values can be converted into a perceptually meaningful Chrominance-Luminance space such as YCbCr by a RBG to YCbCr converter to obtain luminance (Y) and chrominance (Cb,Cr) values. Given that detailed image geometry resides in the luminance channel, processing efficiency can be obtained by first converting the image to a Chrominance-luminance space, calculating importance maps based upon the Luminance channel only, removing selected pixels from the three Luminance-chrominance channels, then converting the image back to it's original color space.

Image resizing is understood to mean both image enlargement and image reduction as is commonly known in the art of digital image resizing. The importance maps generated by the various operators known in the art of content aware image resizing can be used for both to make all or a portion of an image larger or smaller depending on the objectives of the image processing system.

An image processing system refers to any processing system which is involved with the resizing of a received digital image, as defined above. The image can be sent to any of a wide variety of devices known in the arts capable of receiving a digitized image. Such systems include production printers, xerographic devices, image reproduction equipment, photo-processing systems, and the like. Such devices include any device capable of generating, receiving, and/or outputting an image containing data points which, when rendered, produce the resized image as an output. Outputting an image means any form of image generation wherein the resized image is displayed, printed, stored, or transmitted.

To render an image is to provide an image signal as output which can thereafter be used to print or display the image or mark a media substrate using colorants (e.g., inks, toners, pigments, etc.) to form the image from the visual integration of various colorants. The resized image (reduced or enlarged) can also be transmitted as a signal over a network or other communication pathway for subsequent display, print, processing, reproduction, and storage.

Reference is now being made to the flow diagram of FIG. 1 which illustrates one embodiment of the present method for generating a hybrid importance map from a plurality of individual pixel importance maps produced by their respective image operators.

In one example embodiment, at 102, an image to be resized is received. At 104, a plurality of image operators are selected for the image. Each of the image operators is selected because of its responsiveness to changes in neighboring pixels based on the content in the image. At 106, each of the image operators is used to calculate a pixel importance value for each pixel in the image. The pixel importance values are calculated by each image operator with respect to a set of neighbor pixels surrounding the current pixel. The pixel importance values calculated by each operator collectively produce a pixel importance map for the image which is associated with the respective image operator. A plurality of individual pixel importance maps results. At 108, the individual pixel importance maps are normalized and combined in a weighted combination to produce a hybrid importance map for all the image. At 110, the image is resized by selectively retaining pixels based on the hybrid importance map. At step 112, the resized image is then output to an output device such as a display or a printing device.

Pixel importance maps can be generated using a variety of image operators such as, for example, a gradient operator, probabilistic entropy, Laplacian transform, Hough transform, visual saliency, face detection operator, and the like. Such image operators calculate a pixel importance value for a given current pixel based on various characteristics of pixels surrounding the current pixel. The calculated pixel importance values are used to collectively produce a pixel importance map for the image.

One image operator is the entropy operator which, in one embodiment, has the following form:

$$e(I) = -\sum_{k=0}^{G-1} P(k) \log_2(P(k))$$

where G is the number of distinct pixel values and P(k) is the probability of each pixel value. From this formulation a local entropy value (pixel importance value) is calculated based upon a probability or a relative occurrence of a pixel intensity value within its surrounding neighborhood.

Another entropy operator has the following form:

$$c = DCT_2(a),$$

$$e(a) = \sum_{i,j} \|c_{ij}\|^2,$$

$$\forall\, i, j \in \{0, 1, \ldots n\},$$

$$(i, j) \neq 0$$

where $a_{ij}$ is an n×n block of intensity values of neighboring pixels and e(a) is the sum of the squared magnitude of the non-DC DCT coefficients. An entropy operator based on the DCT transform comprehends spatial variation among the neighboring pixels.

The individual pixel importance maps generated by the operators used on the image are normalized in a manner known in the arts. The normalized individual pixel importance maps are combined to produce a hybrid importance map for the image. The resulting hybrid map will take advantage of the individual characteristics of each image operator utilized for the image.

The hybrid map M(I) is generated for image I using a weighted combination of individual pixel importance maps $m_i(I)$ produced by the differing image operators. In one embodiment, the hybrid map is determined as follows:

$$M(I) = \sum_{i=1}^{n} \alpha_i m_i(I),$$

$$\sum_{i=1}^{n} \alpha_i = 1$$

where n is the number of pixel importance maps to be combined and $\alpha_i$ is the desired weighting given to $i^{th}$ pixel importance map.

The individual weighting of the pixel importance maps is based on the end-user's desired resizing characteristics. Such characteristics will likely be influenced by any factors that distortion has on the overall picture quality with respect to scene content. The weights could be predetermined for individual operators for a given type of image or image content and used in such a manner. Other weights are best determined through a trial and error process. Other weighting values will be based on personal experience with a certain operator on a certain type of image content. Thus, any discussion as to any particular weighting or individual weight values used to weight a particular pixel importance map for a particular image, other than that which is discussed with respect to the following figures, has been omitted. It should be appreciated that optimality of the individual weights ($\alpha$) to be applied are best determined on a case by case basis by one skilled in this art.

One skilled in this art would readily understand the process of retaining pixels of interest based on a pixel importance map to resize an image. In one example, a process referred to as "seam carving" is used to selectively retain pixels based on an importance map. Seam carving changes the size of an image by carving out or inserting pixels in different image regions. Seam carving is taught in: *Seam Carving for Content-Aware Image Resizing*, by: Shai Avidan and Ariel Shamir, ACM Transactions on Graphics, Vol. 26, No. 3 (2007) which is incorporated herein by reference in its entirety. As taught therein, a seam is a connected path of low energy pixels crossing the image from top to bottom or from left to right. By successively removing or inserting seams, the size of an image can be reduced or enlarged. For image reduction, seam selection ensures that more of the low energy pixels and fewer of high energy pixels are removed while preserving the image structure. For image enlarging, the order of seam insertion ensures a balance between image content and the artificially inserted pixels. Another process is row and column removal which is well known in this art. Other methods for image resizing (reduction or enlargement) can be used to resize a source image based on the hybrid importance map produced by an application of the present method.

Figure 2:
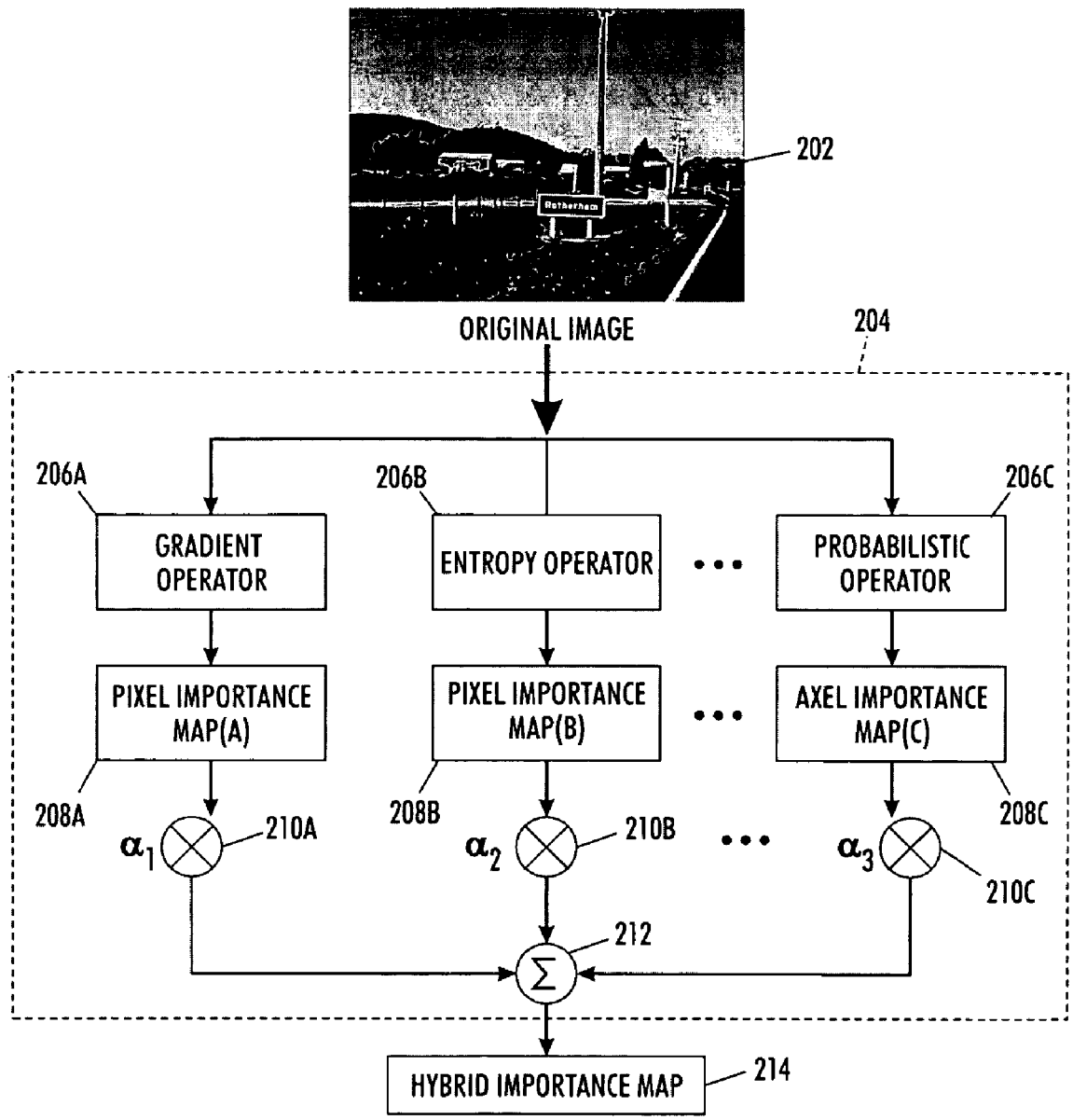
FIG. 2 illustrates a block diagram of one example embodiment of the present method for combining the pixel importance maps generated by the various image operators to produce a hybrid map for the source image.

Reference is now being made to FIG. 2 which illustrates a block diagram of one example embodiment of the present method for combining various pixel importance maps generated by differing image operators to produce a hybrid map for the source image in accordance with the teachings hereof.

A source image 202 to is received. Pixels of the source image are to be processed 204 as follows. Various image operators are first selected for the image based on the operator's responsiveness to changes in neighboring pixels based on image content. In the embodiment shown, one image operator selected is the gradient operator 206A. Another image operator is the entropy operator 206B. Another image operator is the probabilistic operator 206C. Each image operator calculates a pixel importance value for each pixel in the image. The collection of pixel importance values calculated by each image operator produces a corresponding pixel importance map, shown at 208A-C, associated with the respective image operator.

The pixel importance maps are normalized, not shown. The pixel importance maps produced by the gradient operator is given weight ($\alpha_1$) 210A. The pixel importance map produced by the entropy operator is given weight ($\alpha_2$) 210B. The pixel importance map produced by the probabilistic operator is given weight ($\alpha_3$) 210C. The weighted pixel importance maps are combined at 212 in accordance with the function provided herein to produce the hybrid importance map 214 for the input source image 202.

Figure 3A:
FIGS. 3A-D collectively demonstrate a special case of the block 206 of FIG. 2 for n=2, where a hybrid importance map for the image is generated using the gradient and entropy operators each given a weighting of 0.5.
Figure 3B:
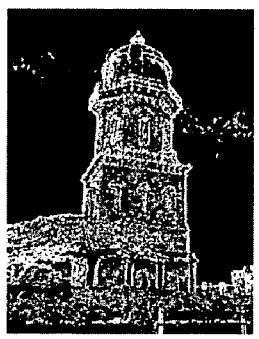
Figure 3C:
Figure 3D:
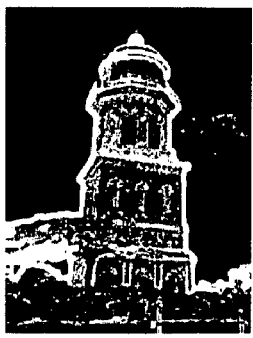

Reference is now being made to FIGS. 3A-D which collectively demonstrate a special case of the processing block 204 of FIG. 2 for n=2 (two operators), where a hybrid importance map generated using the gradient and entropy operators each given a weighting of 0.5. FIG. 3A is the original source image. FIG. 3B shows the entropy mask generated from the pixel importance map produced by the gradient operator (206A). FIG. 3C shows the entropy mask generated from the pixel importance map produced using the entropy operator (206B). FIG. 3D shows the entropy mask generated by the hybrid importance map produced from the weighted combination of the two pixel importance maps (208A and 208B). Note that the hybrid map benefits from the entropy operator's increased emphasis on the dome and upper cornice work and the gradient operator's increased emphasis on the building texture.

Figure 4A:
FIGS. 4A-D shows an example image which demonstrates that the weighted combination of pixel importance maps provides improved reduction than either importance map individually.
Figure 4B:
Figure 4C:
Figure 4D:

Reference is now being made to FIGS. 4A-D providing an example image which demonstrates that the weighted combination of pixel importance maps provides improved reduction than either importance map individually. FIG. 4A shows the original source image. FIG. 4B shows the source image with a 100% gradient with a 15% reduction. FIG. 4C shows the source image with 100% entropy. FIG. 4D shows the source image with a 60% gradient with 40% entropy combination. Note that the gradient operator preserves the dimensionality of the building but the dome and it's surrounding catwalk suffer. On the other hand, the entropy operator preserves the dome but the level below the catwalk is compromised. Using the weighted combination preserves both the dome and catwalk while reducing the distortion of the level below the catwalk.

Figure 5A:
FIGS. 5A-D demonstrates how assigning different weighing values to the individual pixel importance maps improves performance.
Figure 5B:
Figure 5C:
Figure 5D:

Reference is now being made to FIGS. 5A-D which demonstrates how assigning different weighing values to the pixel importance maps improves performance. FIG. 5A shows the original image. FIG. 5B shows the source image processed with a 100% gradient with 40% reduction. FIG. 5C shows the source image with 100% entropy. FIG. 5D shows the source image using a hybrid map comprised of 70% gradient and 30% entropy. Note that the hybrid combination provides a more realistic shoreline and a more gradual water transition.

The present method provides a high degree of image resizing flexibility and has broad applicability across differing classes of images and will find its uses in a variety of applications such as display, printing, packaging, and other document image processing software performing document layout, image personalization, and the like.

Figure 6:
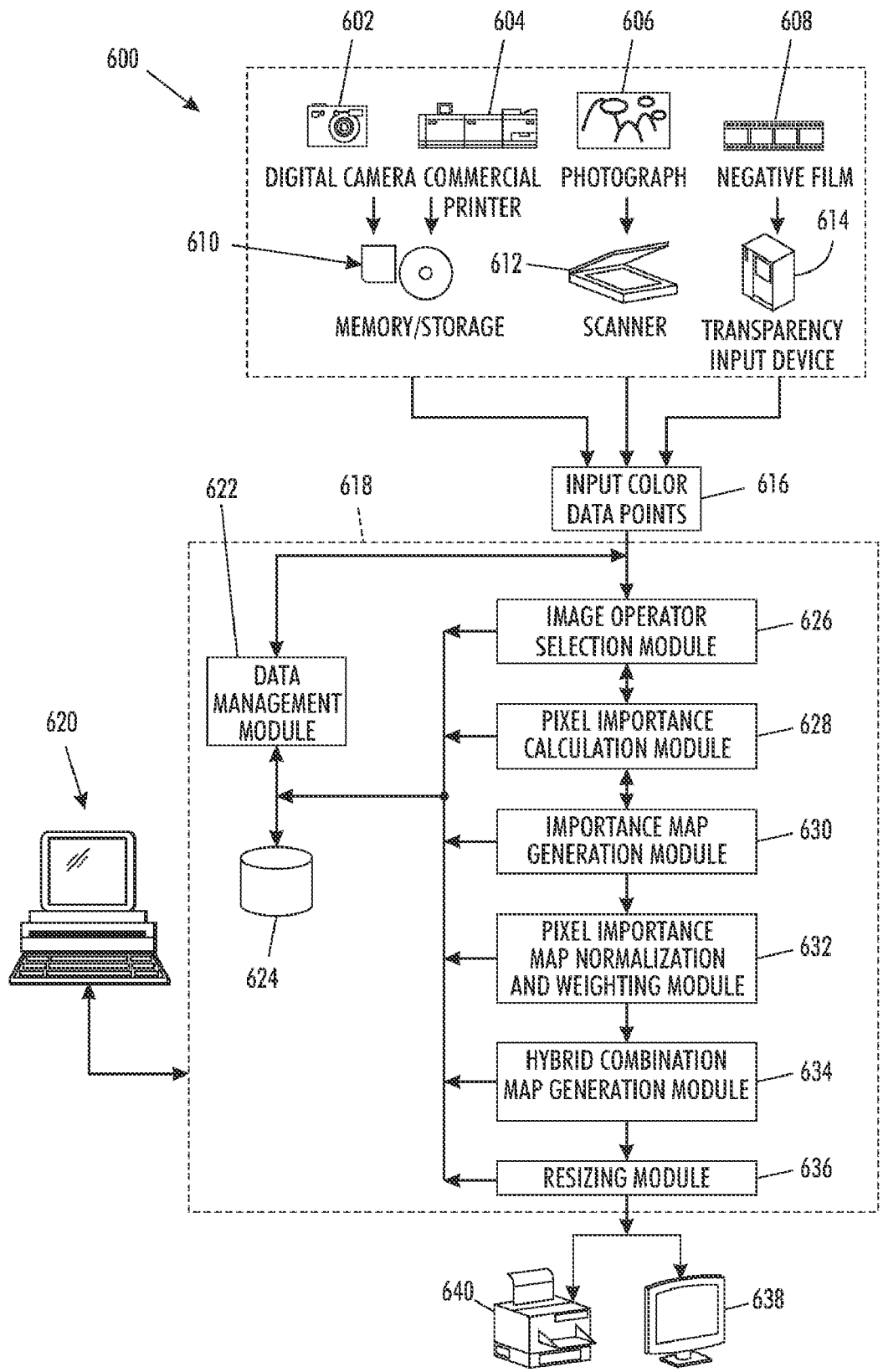
FIG. 6 illustrates one example process flow of the present image resizing method.

Reference is now being made FIG. 6 which illustrates one example process flow of the present image method.

In the general purpose color management system of FIG. 6, a source image to be resized is captured in a plurality of ways. The source image may be captured by a digital camera 602 and transferred via a USB connection. Data from the source image may be captured a commercial printer 604. A source photograph 606 may be captured through a scanning device 612 and the input color data transferred via a cable over a network The source image may be a light-sensitive material of a color or monochrome negative film 608 read by a transparency input device 614. Source image data can read from a memory device 610 such as a floppy disk or a compact disk. The received source image has a plurality of pixels comprising input color data points 616.

The general purpose color management system 600 further includes an image processing module 618 capable of executing various aspects of the present method and performing other functionality as will be described herein further. The image processing module resides in computer system 620 as a hardware and/or software construct and carries out processing in accordance herewith on the input color data 616 received from the any of the imaging devices previously discussed. The image processing module also carries out image processing on the basis of commands inputted from the input devices associated with computer 620 or which have been received over a communication network not shown The computer system shown can be any of a personal computer, workstation, or any computing system common in the image processing arts and capable of performing image processing operations through various hardware and/or software applications. Various types of image manipulation applications such as PhotoShop, may additionally be performed by the computer system. The computer system 620 may be connected to a server via a network such as a LAN, a WAN, or the like, through which the input color data 616 is transmitted and received. The image processing module may be provided has a general structure having an external memory such as a ROM, a RAM, an HD, or the like, or as a special purpose computer as discussed herein further.

The input color data 616 may be transferred to data management module 622 for indexing and storage on storage device 624. Similarly, the data stored in the storage device may be retrieved. The image operator selection module 626 selects a plurality of image operators to be used to produce individual pixel importance maps for the source image based on image pixels 616. The individual image operators may be retrieved by the operator selection module 626 from storage 624 and values and data required for the associated operator can be additionally stored in the storage device.

The pixel importance calculation module 628 receives pixels and the selected image operators and performs the pixel importance calculations for each pixel by each of the image operators. Processing repeats in importance value calculation module 628 for each of the selected image operators until all received pixels of the source image have been processed. The calculated individual pixel importance values are passed to an importance map generation module 630 wherein the importance values are assembled into individual pixel importance maps. Each produced pixel importance map is associated with the image operator used to calculate the respective pixel importance values.

After all the individual pixel importance maps have been produced, pixel importance maps are passed to pixel importance map normalization module 632 wherein the individual importance maps are normalized and individually weighted according to user-defined preferential weighting factors. The normalized and weighted pixel importance maps proceed to hybrid combination map generation module 634 wherein the individual pixel importance maps are combined into a single hybrid importance map. The produced hybrid map then proceeds to image resizing module 636 wherein the image is resized (reduced or enlarged) by selectively retaining image pixels of interest according to the generated hybrid importance map. The resized image is thereafter output to image reproduction device 638 or display device 640.

Figure 7:
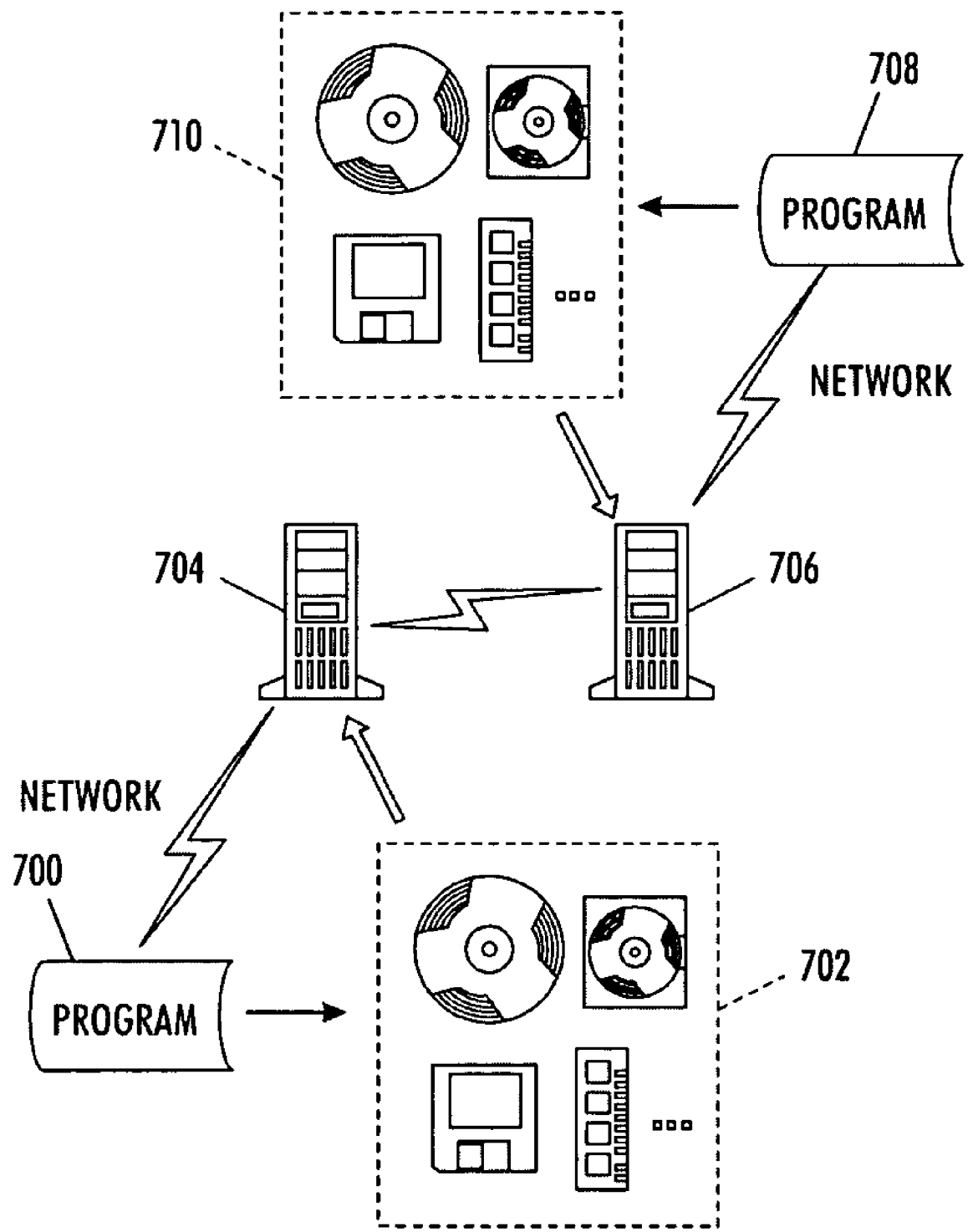
FIG. 7 is an explanatory diagram illustrating one example of a computer readable storage medium capable of storing machine readable instructions which, when mounted on a computer system, cause the computer system to perform one or more aspects of the present method.

Reference is now being made to FIG. 7 which is an explanatory diagram illustrating one example of a computer readable storage medium capable of storing machine readable instructions which, when mounted on a computer system, cause the computer system to perform one or more aspects of the present method as described herein above.

One or more computer program instructions 700 for carrying out the present method are loaded on computer readable media 702 which includes media such as optical disks (CD-ROM etc.), magnetic disks, magnetic cards, memories (including IC cards and memory card). The storage media stores the machine readable program instructions for sale, transport, and storage by changing magnetic, optical, and/or electric energy states in response to program description instructions having been transferred to the media. The storage medium can then be mounted on computer system 704 and the instruction contained in the computer readable medium executed. The machine readable instructions loaded onto computer system 704 can them be transmitted or otherwise communicated to computer system 706 and mounted thereon. The machine readable instructions can then be executed. The machine readable program instructions can be transferred over a network original form or modified or incorporate with another program 708 and stored on storage media 710. The computer systems include processors or special purpose computers capable of executing machine readable program instructions for carrying out one or more aspects of the present method as described herein. This illustration shows that the machine readable instructions may be executed by one computer system, modified (or sold), and transferred to another computer system and off-loaded onto another computer program product.

One or more aspects of the present method can be implemented on a special purpose computer. Such a special purpose computer can be integrated, in whole or in part, with, for example, a xerographic system or a color management or image processing software or system. A special purpose computer includes a processor capable of executing machine readable program instructions for carrying out one or more aspects of the present method. The processor of the special purpose computer for executing machine program instructions carrying out various aspects of the present method may be any of a micro-processor or micro-controller, ASIC, electronic circuit, or hardware designed to effectuate the present method.

One such special purpose computer includes a main memory capable of storing machine readable instructions to be executed and may include random access memory (RAM) to support reprogramming and flexible data storage. The main memory may further include one or more buffers to store executable machine program instructions that implement the methods described herein. The special purpose computer may also include a secondary memory. The secondary memory may include, for example, a hard disk drive and/or a removable storage drive which reads/writes to a removable storage device such as a floppy disk, magnetic tape, optical disk, etc., used to store computer software and other machine readable instructions and data. The secondary memory may further include other mechanisms for allowing computer programs or other machine executable instructions to be loaded into the processor for execution. Such mechanisms may include, for example, removable storage adapted to exchange data through an interface. Examples of other such mechanisms include a program cartridge and cartridge interface such as that found in video game devices, a removable memory chip such as an EPROM, or PROM, and associated socket, and other removable storage units and interfaces which effectuate the transfer of software and/or data.

The special purpose computer additionally includes a communications interface which acts as both an input and an output to allow software and data to be transferred to/from external devices. Examples of a communications interface include a modem, a network interface such as an Ethernet card, a communications port, a PCMCIA slot and card, etc. Software and data transferred via the communications interface are in the form of signals and data which may be, for example, electronic, electromagnetic, optical, or other signals capable of being transmitted and received via a communications channel configured to carry such signals through wire, cable, fiber optic, phone line, cellular link, RF, or other data transmission means. The special purpose computer may additionally include a display interface that forwards data to a display device or monitor and further be placed in communication with a scanning device capable of receiving color images and transforming the images in electronic format via the communications interface. Such a scanning device would be capable of determining the intensity, color, magnitude, location, spatial variation, and the like from the image pixels comprising the scanned color image.

All or portions of the flow diagrams of the present method may also be implemented partially or fully in hardware in conjunction with machine executable instructions. A network connection may be utilized for receiving source image color data points over a network such as an intranet or internet. The computer may also be placed in digital communication with one or more electronic media readers for the input of image data or from a database or other storage media common in the arts.

The term computer program product is intended to include any computer readable medium, computer executable medium, computer usable medium, or machine readable media capable of providing instructions and/or data to a computer system for implementing one or more aspects of the present method as described above. The computer program product is capable of storing data, instructions, messages packets, or other machine readable information, and includes non-volatile memory, such as a floppy disk, hard drive and volatile memory such as ROM, RAM, flash, and the like. It may further include a CD-ROM, DVD, tape, cassette, or other digital or analog media, capable of having embodied thereon one or more logical programming instructions or other machine executable codes or commands that implement and facilitate the function, capability, and methods disclosed herein. The computer program product may additionally contain information held in a transitory state such as a network link or a network interface which may include a wired network or a wireless network which allows a computer to read such computer readable information.

It should be understood that the flow diagrams of the present method are illustrative. Other operations, for example, may be added, modified, enhanced, condensed, integrated, or consolidated. Variations thereof are intended to fall within the scope of the appended claims. It should also be understood that one or more aspects of the present method are intended to be incorporated in an article of manufacture, including one or more computer program products.

The article of manufacture may be included on a storage device readable by a machine architecture, xerographic system, color management or other image processing system, any of which capable of executing program instructions containing the present method. Such an article of manufacture may be shipped, sold, leased, or otherwise provided separately either alone or as part of an add-on, update, upgrade, download, or product suite by the assignee or a licensee hereof as part of a computer system, xerographic system, document processing system, image processing system, color management system, operating system, software program, plug-in, DLL, or a storage device.

It will be appreciated that the above-disclosed features and functions and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A method for producing a hybrid importance map for a source image in a color management system, the method comprising:

receiving, into a memory, a source image having a plurality of pixels;

selecting a plurality of image operators for said image, each image operator being responsive to pixel changes based on content of said image;

calculating, for each pixel in said image, pixel importance values using said selected image operators, said pixel importance values being determined by the image operator with respect to a set of neighbor pixels surrounding a current pixel;

producing pixel importance maps based on said pixel importance values determined by said image operators;

normalizing said pixel importance maps;

weighting said pixel importance maps;

combining said weighted pixel importance maps to generate a hybrid importance map for all of said image, where said hybrid importance map M(I) comprises:

$$M(I) = \sum_{i=1}^{n} \alpha_i m_i(I),$$

$$\sum_{i=1}^{n} \alpha_i = 1,$$

where n is the number of pixel importance maps, $m_i(I)$ is the $i^{th}$ pixel importance map generated by the $i^{th}$ operator for image I, and $\alpha_i$ is the weighting factor assigned to the $i^{th}$ pixel importance map, and whereby different weighing factors $\alpha_i$ are assigned to each of the pixel importance maps $m_i$ so that the sum of each weighting factor $\alpha_i$ over n pixels is equal to one;

resizing said source image by selectively retaining image pixels based on said hybrid importance map; and outputting said resized image to an output device.

2. The method of claim 1, wherein said image operators comprise any of a gradient, probabilistic entropy, Laplacian transform, Hough transform, visual saliency, and face detection operator.

3. The method of claim 1, wherein at least one of said image operators comprises a local entropy operator that is responsive to a magnitude of a variation between neighboring pixels.

4. The method of claim 3, wherein said local entropy operator is based on a DCT transform comprising:

$$c = DCT_2(a),$$

$$e(a) = \sum_{i,j} \|c_{ij}\|^2,$$

$$\forall\, i, j \in \{0, 1, \ldots n\},$$

$$(i, j) \neq 0,$$

where $a_{ij}$ is an n×n block of intensity values, and e(a) is a sum of the squared magnitude of the non-DC DCT coefficients.

5. A color management system for producing a hybrid importance map for a source image, the system comprising:
a storage medium capable of storing data; and
a processor in communication with said storage medium, said processor capable of executing a machine readable instruction for performing the method of:
receiving, into a memory, a source image having a plurality of pixels;
selecting a plurality of image operators for said image, each image operator being responsive to pixel changes based on content of said image;
calculating, for each pixel in said image, pixel importance values using said selected image operators, said pixel importance values being determined by the image operator with respect to a set of neighbor pixels surrounding a current pixel;
producing pixel importance maps based on said pixel importance values determined by said image operators;
normalizing said pixel importance maps;
weighting said pixel importance maps;
combining said weighted pixel importance maps to generate a hybrid importance map for all of said image, where said hybrid importance map M(I) comprises:

$$M(I) = \sum_{i=1}^{n} \alpha_i m_i(I),$$

$$\sum_{i=1}^{n} \alpha_i = 1,$$

where n is the number of pixel importance maps, $m_i(I)$ is the $i^{th}$ pixel importance map generated by the $i^{th}$ operator for image I, and $\alpha_i$ is the weighting factor assigned to the pixel $i^{th}$ importance map, and whereby different weighing factors $\alpha_i$ are assigned to each of the pixel importance maps $m_i$ so that the sum of each weighting factor $\alpha_i$ over n pixels is equal to one;
resizing said source image by selectively retaining image pixels based on said hybrid importance map; and
outputting said resized image to an output device.

6. The system of claim 5, wherein said image operators comprise any of a gradient, probabilistic, entropy, Laplacian transform, Hough transform, visual saliency, and face detection operator.

7. The system of claim 5, wherein at least one of said image operators comprises a local entropy operator that is responsive to a magnitude of a variation between neighboring pixels.

8. The system of claim 7, wherein said local entropy operator is based on a DCT transform comprising:

$$c = DCT_2(a),$$

$$e(a) = \sum_{i,j} \|c_{ij}\|^2,$$

$$\forall\, i, j \in \{0, 1, \ldots n\},$$

$$(i, j) \neq 0,$$

where $a_{ij}$ is an n×n block of intensity values, and e(a) is a sum of the squared magnitude of the non-DC DCT coefficients.

9. A computer program product for producing a hybrid importance map for a source image in a color management system, the computer program product comprising:
a non-transitory computer readable medium for storing instructions that, when executed on a computer, cause the computer to perform a method comprising:
receiving, into a memory, a source image having a plurality of pixels;
selecting a plurality of image operators for said image, each image operator being responsive to pixel changes based on content of said image;
calculating, for each pixel in said image, pixel importance values using said selected image operators, said pixel importance values being determined by the image operator with respect to a set of neighbor pixels surrounding a current pixel;
producing pixel importance maps based on said pixel importance values determined by said image operators;
normalizing said pixel importance maps;
weighting said pixel importance maps;
combining said weighted pixel importance maps to generate a hybrid importance map for all of said image, where said hybrid importance map M(I) comprises:

$$M(I) = \sum_{i=1}^{n} \alpha_i m_i(I),$$

$$\sum_{i=1}^{n} \alpha_i = 1,$$

where n is the number of pixel importance maps, $m_i(I)$ is the $i^{th}$ pixel importance map generated by the $i^{th}$ operator for image I, and $\alpha_i$ is the weighting factor assigned to the pixel $i^{th}$ importance map, and whereby different weighing factors $\alpha_i$ are assigned to each of the pixel importance maps $m_i$ so that the sum of each weighting factor $\alpha_i$ over n pixels is equal to one;
resizing said source image by selectively retaining image pixels based on said hybrid importance map; and
outputting said resized image to an output device.

10. The computer program product of claim 9, wherein said image operators comprise any of a gradient, probabilistic, entropy, Laplacian, Hough, visual saliency, and face detection operator.

11. The computer program product of claim 9, where at least one of said image operators comprises a local entropy operator that is responsive to a magnitude of a variation between neighboring pixels, said local entropy operator being based on a DCT transform comprising:

$$c = DCT_2(a),$$

$$e(a) = \sum_{i,j} \|c_{ij}\|^2,$$

$$\forall\, i, j \in \{0, 1, \ldots n\},$$

$$(i, j) \neq 0,$$

where $a_{ij}$ is an n×n block of intensity values, and e(a) is a sum of the squared magnitude of the non-DC DCT coefficients.

* * * * *